United States Patent [19]

Okada

[11] Patent Number: 4,660,161
[45] Date of Patent: Apr. 21, 1987

[54] CORRECTION METHOD FOR VEHICLE-MOUNTED GEOMAGNETIC FIELD SENSORS

[75] Inventor: Yasushi Okada, Saitama, Japan

[73] Assignee: Honda Giken Kogyo Kabushiki Kaisha, Tokyo, Japan

[21] Appl. No.: 620,464

[22] Filed: Jun. 14, 1984

[30] Foreign Application Priority Data

Jun. 17, 1983 [JP] Japan .................. 58-109817

[51] Int. Cl.$^4$ .................. G01C 17/38; G06F 15/50
[52] U.S. Cl. .................. 364/571; 364/457; 33/356
[58] Field of Search .................. 364/424, 449, 457, 571; 33/355 R, 356, 357

[56] References Cited

U.S. PATENT DOCUMENTS

| | | | |
|---|---|---|---|
| 4,091,543 | 5/1978 | Lapeyre | 33/356 |
| 4,414,753 | 11/1983 | Moulin et al. | 33/356 |
| 4,416,067 | 11/1983 | Scherer et al. | 33/356 |
| 4,445,279 | 5/1984 | Tsushima et al. | 33/356 |
| 4,480,226 | 10/1984 | Kuno et al. | 33/356 |
| 4,497,034 | 1/1985 | Kuno et al. | 364/571 |
| 4,546,550 | 10/1985 | Marchent et al. | 33/356 |

*Primary Examiner*—Gary Chin
*Attorney, Agent, or Firm*—Irving M. Weiner; Joseph P. Carrier; Pamela S. Burt

[57] ABSTRACT

A correction method for a geomagnetic field sensor (11) of a bearing indication system (10) mounted on a vehicle including a signal processor (13) for processing an output signal (Vx, Vy) of the sensor. The signal processor includes a storing function (15), comprising steps of storing the output signal of the sensor as data (6) of the bearing of the vehicle, while the vehicle is traveling, and computing a bearing correction vector (Xoff, Yoff) for correcting the output signal of the sensor on the basis of the stored bearing data. When the vehicle is judged to be subjected to a strong magnetic field, the bearing data stored may be all cleared. The bearing correction vector may be updated each time when a predetermined period of time is elapsed or the vehicle has traveled a predetermined distance.

5 Claims, 10 Drawing Figures

CORRECTION METHOD FOR VEHICLE-MOUNTED GEOMAGNETIC FIELD SENSORS

BACKGROUND OF THE INVENTION

1. Field of the Invention

The present invention relates to a correction method for a geomagnetic field sensor mounted on a vehicle.

2. Description of Relevant Art

The geomagnetic field sensor is a magnetometer for detecting the spot geomagnetic force in the form of a vector, and has been and is utilized as a bearing sensor for vehicle-mounted bearing meters for detecting the bearing of a vehicle to inform the driver of such bearing.

There has been disclosed in Japanese Patent Lay-Open Print No. 58-70114 (Apr. 26, 1983) a correction method for a geomagnetic field sensor of a vehicle-mounted bearing indication system, as described below with reference to the accompanying prior art drawings FIG. 6 to FIG. 10.

In FIG. 6, which is a schematic connection diagram of a bearing indication system for vehicles, the bearing indication system includes a geomagnetic field sensor 1 of the flux gate type of a well-known toroidal core design. Sensor 1 detects the spot geomagnetic force in the form of a radius vector A on a horizontal X-Y plane as orthogonal coordinates of which X and Y axes are fixed to be perpendicular to a main sensing direction D or the direction of the main sensing axis of the sensor 1 and to be directed in the main sensing direction D, respectively. The vector A consists of a pair of orthogonal components, i.e., an X component as X direction sine of the geomagnetic force vector A and a Y component as Y direction cosine thereof. Sensor 1 outputs the vector A in the form of a pair of voltages Vx', Vy' proportional to the X and Y components thereof, respectively. An amplifying circuit 2 is connected to the geomagnetic field sensor 1. The circuit 2 includes a pair of amplifiers 2a, 2b for amplifying the voltages Vx', Vy' to thereby output corresponding amplified voltages Vx, Vy,. A bearing meter 3 is connected, directly in a simple example, to the amplifying circuit 2. The meter 3 includes a bearing pointer 3a for indicating the bearing of a vehicle relative to the geomagnetic north N at each travelling spot in accordance with the amplified output voltages Vx, Vy. In an improved example, a signal processor (not shown) is interposed between the amplifying circuit 2 and the bearing meter 3. The processor is adapted to correct the output voltages Vx, Vy making use of the conception of a later-described offset point. In the bearing meter 3, the voltages Vx, Vy as directly input or corrected are combined with each other to generate a magnetic field in which the bearing pointer 3a, having secured thereto a permanent magnet (not shown), is caused to rotate by an angle of corresponding degrees, thererby indicating the bearing of the vehicle.

The bearing meter 3 has an input terminal a for receving the voltage Vx, and another input terminal b for receiving the voltage Vy. With an X-Y recorder or plotter 4 connected to the terminals a, b, when the geomagnetic field sensor 1 as put in a sufficiently uniform geomagnetic field is turned by one revolution in the inital X-Y plane, the X-Y recorder 4 has thereon a circular trace B (FIG. 7) drawn about the center thereof located at the origin O of Vx-Vy orthogonal coordinates of the recorder 4. The set of coordinates (Vx, Vy) constitutes a mapping in the X-Y plane of the geomagnetic force vector A, such that the axes of abscissa and ordinate Vx, Vy indicate the west-to-east and south-to-north directions, respectively, at any geographical spot of the sensor 1. When the main sensing direction D of the sensor 1 is put in any position relative to the geomagnetic north N in the X-Y plane or substantially to the absolute geomagnetic north, the recorder 4 has plotted on its Vx-Vy plane a point P in the same position as above relative to the geomagnetic north N as mapped on the Vx-Vy plane, thereby visualizing the variation of the geomagnetic field as detected by the sensor 1. Accordingly, with respect to a located vector C beginning at the origin O and ending at the plotted point P on the Vx-Vy plane, the direction of the vector C relative to the axis Vy represents the bearing of the sensor 1 relative to the absolute geomagnetic north.

As shown in FIG. 8, in a practical example, the above-described bearing indication system is mounted on a vehicle 5, with the main sensing direction D of the sensor 1 in coincidence with the direction F of the longitudinal centerline of the vehicle 5. When the vehicle 5 is driven to travel in a circle in a sufficiently uniform geomagnetic field, thus causing the geomagnetic field sensor 1 to turn by one revolution, the X-Y recorder plots on the Vx-Vy plane a circular trace B' (FIG. 9) about a center O' thereof which usually deviates from the origin O, due to the magnetization of a vehicle body of the vehicle 5. In other words, the vehicle 5 has generated by the body magnetization a local magnetic field representable by a located vector OO' beginning at the origin O and ending at the deviated center O'. In this respect, at any plotted point P on the Vx-Vy plane, the pointer 3a of the bearing meter 3 will indicate, as the apparent bearing of the vehicle 5, the same direction as a located vector C' beginning at the origin O and ending at the point P on the Vx-Vy plane, while the true bearing of the vehicle 5 should be indicated as the direction of a located vector O'P beginning at the deviated center O' and ending at the point P.

In the above-described bearing indication system, to avoid such influence of the local magnetic field due to the body magnetization of the vehicle 5 on the geomagnetic field sensor 1 mounted on the vehicle 5, the amplified output voltages Vx, Vy are corrected by the signal processor having applied thereto a correction method. Such method includes steps of driving the vehicle 5 in a circle, thereby unveiling the deviation of the detected geomagnetic field due to unneglectable body magnetization such as the crossing magentization of the vehicle 5, and correcting the output voltages Vx, Vy in consideration of such deviation. More particularly, in the correction method, by driving the vehicle 5 in a circle, there are obtained on the Vx-Vy plane a maximum value Vxmax in a set of Vx components and a minimum value Vxmin therein and likewise a maximum value Vymax in a set of Vy components and a minimum value Vymin therein, as shown in FIG. 10. The deviation is determined in terms of an offset point (Xoff, Yoff) by using a pair of expressions such that:

Xoff = ½ (Vxmax + Vxmin)

Yoff = ½ (Vymax + Vymin)

Then, the X and Y components Xoff, Yoff of the offset point are subtracted from the output voltages Vx, Vy, respectively, before these are input to the bearing meter 3, thereby indicating the bearing, i.e., the traveling direction, of the vehicle 5 relative to the geomagnetic north N at each traveling spot.

Incidentally, in the foregoing description, the origin O of the Vx-Vy coordinates is a point at which the sensor 1 has zero ouput and is easy to identify. Further, the identification of the extreme values Vxmax, Vxmin, Vymax, and Vymin and the results thereof, as well as the offset point (Xoff, Yoff) are processed by and stored in the signal processor. In the processor, the local magnetic field due to body magnetization or the vector OO' given in terms of an offset vector (Xoff, Yoff) is eliminated or componentwise deducted from the apparent geomagnetic field or the vector C', i.e., a parallel displacement vector (−Xoff, −Yoff) opposite in the direction to the offset vector (Xoff, Yoff) is added to the apparent geomagnetic force vector C'.

According to the conventional correction method, however, even after a vehicle equipped with an offset-corrected bearing indication system i.e., a conventional system having an offset point once stored in a signal processor, has traveled through a strong magnetic field, erroneous bearings may still undesirably be generated and displayed. For example, a strong magnetic field occurs when crossing an electric railroad, whereby the vehicle becomes varied in its magnetic field due to body magnetization. In such a situation the signal processor has a parallel displacement vector still associated with the stored (and now incorrect) offset point, and which parallel displacement vector is added as it has been to an apparent geomagnetic force vector at each traveling spot Thus, an erroneous bearing will be given on a bearing meter of the bearing indication system.

In this respect, such erroneous indication can be preventable by driving the vehicle to make a single turn, each time when having passed such strong magnetic field, to thereby update the offset point. However, the fact that it is considerably difficult for the driver to know from time to time the variation of the magnetic field due to body magnetization of the vehicle must be considered. Also, the driving maneuver of making the single turn for no more than the output correction of a geomagnetic field sensor is practically troublesome and inconvenient for the driver. Forcing the driver to make such correction from time to time would reduce the commercial value of the bearing indication system.

Moreover, according to the above-described correction method, in which the offset point is determined by way of what is called a maximum-minimum method from respective maximum and minimum values of output signals of the geomagnetic field sensor, when setting an offset point there are electromagnetic factors other than the vehicle body magnetization which must be considered, such as other vehicles in the vicinity, a geographically localized abnormal magnetic field, and a high-tension cable or transmission line. Thus, the offset point stored remains erroneous, giving an erroneous indication of the bearing of the vehicle, until a subsequent setting has a correct offset point computed to be stored.

The present invention has been achieved to effectively overcome such problems in the conventional correction method for geomagnetic field sensors.

SUMMARY OF THE INVENTION

An object of the present invention is to provide a correction method for vehicle-mounted geomagnetic field sensors, which permits an output of such geomagnetic field sensor to be automatically corrected without the need of particular operations of a driver of the vehicle while the vehicle is traveling.

According to the present invention, there is provided a correction method for a geomagnetic field sensor of a bearing indication system mounted on a vehicle, the bearing indication system including a signal processor for computing and outputting a bearing of the vehicle in accordance with an output signal of the geomagnetic field sensor, the signal processor having a storing function for storing data of the bearing of the vehicle, and a display unit for displaying the bearing of the vehicle in accordance with an output of the signal processor, comprising a first step of storing the output signal of the geomagnetic field sensor as the data of the bearing of the vehicle with respect to all directions while the vehicle is traveling, a second step of computing to store a bearing correction vector on the basis of the data of the bearing of the vehicle as stored, and a third step of outputting a correction signal on the basis of the bearing correction vector as stored.

The above and further features, objects and advantages of the present invention will become more fully apparent from the following detailed description of the preferred embodiment of the invention when the same is read in conjunction with the accompanying drawings.

DETAILED DESCRIPTION OF THE PREFERRED EMBODIMENT

Figure 3:
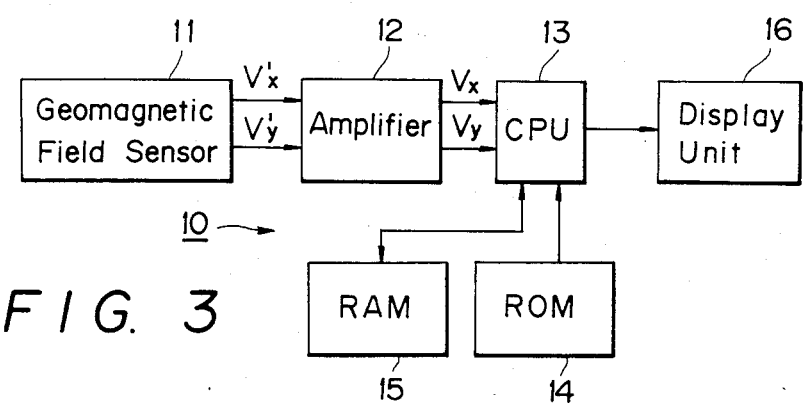
FIG. 3 is a block diagram of a bearing indication system to which the present invention is applicable.
Figure 6:
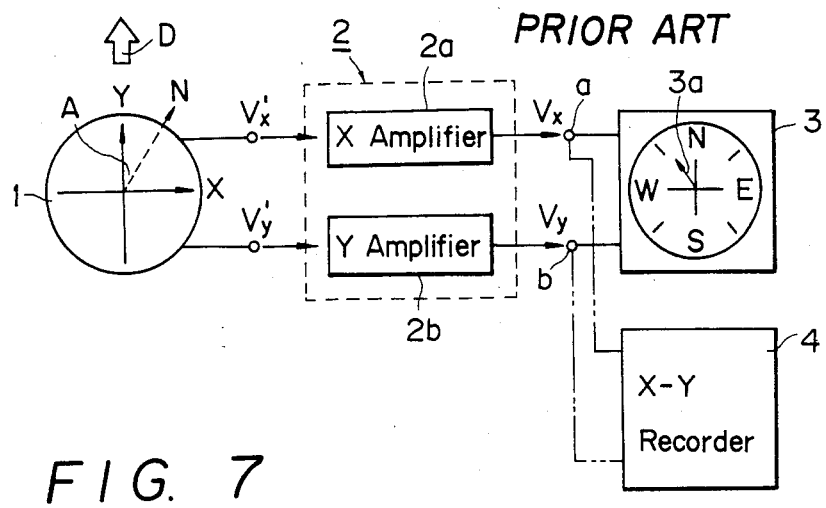
FIG. 6 is a schematic connection diagram of a simple bearing indication system without a signal processor, to which indication system is applied the above-described conventional correction method for vehicle-mounted geomagnetic field sensors.
Figure 7:
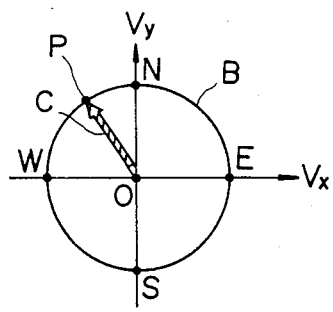
FIG. 7 is a graph on which is mapped, through an X-Y recorder as well as a geomagnetic field sensor of the bearing indication system of FIG. 6, an ideal geomagnetic field without local magnetic fields, such as due to vehicle body magnetization.
Figure 8:
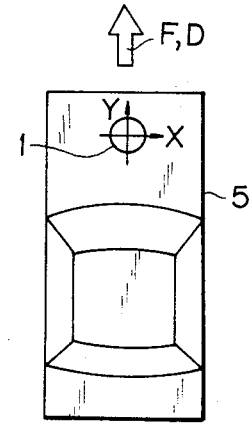
FIG. 8 is a schematic plan view of a vehicle on which is mounted the bearing indication system of FIG. 6.

Although the present invention is applicable to any bearing indication system of a constitution substantially similar to that of FIG. 6, for easy understanding there is shown in FIG. 3 a block diagram of a suitable example of such bearing indication system.

Referring first to FIG. 3, designated at reference numeral 10 is a bearing indication system. The bearing indication system includes a geomagnetic field sensor 11 of a flux gate type of a toroidal core design. An amplifier 12 is connected to the geomagnetic field sensor 11, and is adapted for amplifying a pair of output voltages Vx', Vy' of the sensor 11 by a proper degree of amplification into a pair of voltage signals Vx, Vy to be output. A CPU (central processing unit) 13 is connected to the amplifier 12 and adapted for processing the output signals Vx, Vy of the amplifier 12. The CPU 13 has a ROM (read-only memory) 14 connected thereto for storing a program for operating the CPU 13. A RAM (random access memory) 15 is connected thereto for permitting the CPU 13 to write therein and read therefrom necessary data. A display unit 16 is connected to the CPU 13, and is adapted for displaying on the basis of an output signal of the CPU 13 the bearing of a vehicle on which this indication system 10 is mounted.

Figure 1:
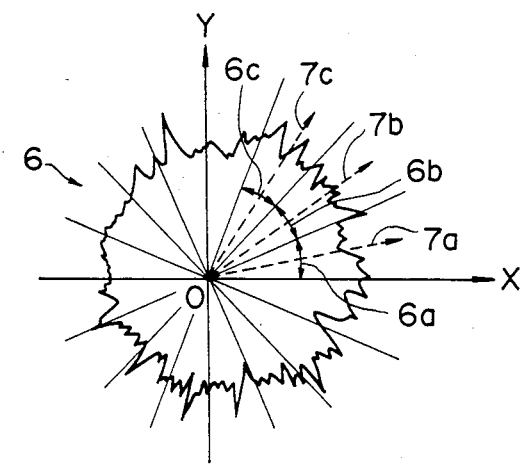
FIG. 1 is a graph showing a typical example of data of magnetic forces as detected to be output through a geomagnetic field sensor while a vehicle which has mounted thereon the geomagnetic field sensor is traveling.
Figure 9:
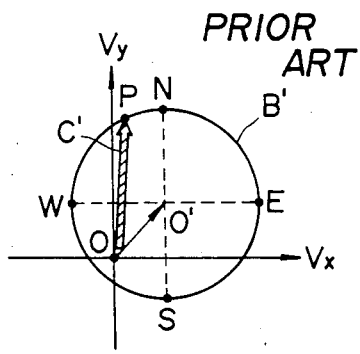
FIG. 9 is a graph on which a geomagnetic field is mapped in a manner similar to FIG. 6, while taking into consideration a magnetic field due to body magnetization of the vehicle of FIG. 8.
Figure 10:
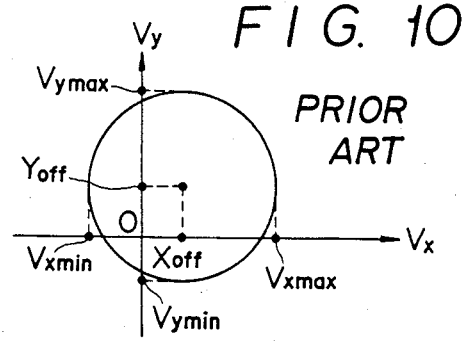
FIG. 10 is a graph similar to FIG. 9, for explaining the conventional correction method applied to the bearing indication system of FIG. 6.

Referring now to FIG. 1 as a graph on an X-Y plane of which axes of abscissa X and ordinate Y correspond to those Vx, Vy of FIG. 10, respectively, when plotted in all directions in a manner similar to that described in conjunction with FIGS. 6 and 9, those magnetic forces detected by the sensor 11, and given in the form of bearing data as output signals Vx, Vy trace a closed loop 6 as a set of loci of the bearing data. The bearing data are non-continuously stored in the RAM 15.

As seen from FIG. 1, though being notched, the loop 6 has a substantially circular form about an origin O of coordinates (X, Y) so that, when the whole circumference angle 360° is divided equally into 16 ranges 6a, 6b, 6c, . . . , those loci of the bearing data appearing in each 16th angle range can be found within a certain range of a radial distance from the origin O. In each 16th angle range 6a, 6b, 6c, . . . , the loci of the bearing data are averaged of the radial distance to have an average radius relative to the origin O. The associated bearing data are assumed to be represented by an average point located at a distance equal to the average radius from the origin O in the direction of a bisector 7a, 7b, 7c, . . . , the average point being designated at reference character 8a, 8b, 8c, . . . in FIG. 2.

Figure 2:
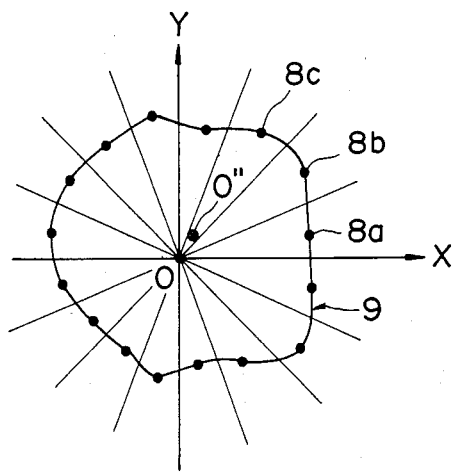
FIG. 2 is a graph showing an average magnetic force of each 16th angle range, obtained from FIG. 1, according to the preferred embodiment of the present invention.

As shown in FIG. 2, when curvilinearily connected by a solid line from point to point, the average points 8a, 8b, 8c, . . . give a substantially circular trace 9. The trace 9 has a center O'' thereof determined by using at least three of the average points 8a, 8b, 8c, . . . , which center O'' is to be utilized as a later-described offset point for correcting the signal voltages Vx, Vy as the bearing data given by the geomagnetic field sensor 11. Though selectable in a random manner from the total 16 points 8a, 8b, 8c, . . . , the three average points are suitably selected to be as distant as possible from one other. Incidentally, as will be easily understood, the center O'' of the trace 9 may be determined so as to constitute the center of the circumscribed circle of the selected three average points.

As described before, the computation of the offset point based on the notched closed loop 6 as the loci of the detected bearing data and the storing of the offset point are performed in the bearing indication system 10. Additionally, the bearing indication system 10 functions to store the bearing data and display the bearing as corrected by using the concept of the offset point.

Figure 4:
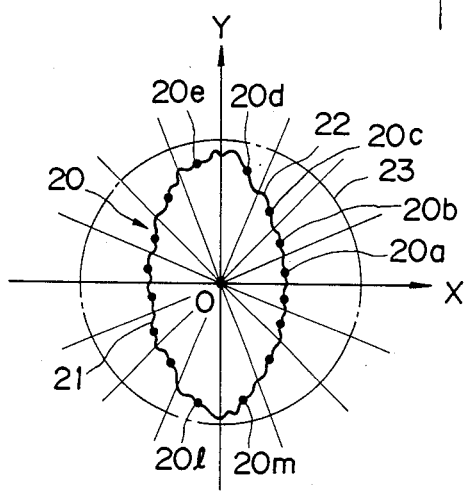
FIG. 4 is a graph showing an example of data of magnetic forces as detected to be output through the geomagnetic field sensor of FIG. 1 in an abnormal geomagnetic field.

In this respect, referring now to FIG. 4, a phenomenon occurs in certain geographical areas such as a place with a number of superhighways gathered close together. When processed in a manner similar to that employed in connection with FIG. 2 for obtaining the average point of each 16th angle range, the bearing data obtained while the vehicle is traveling may give a substantially elliptic trace 20 consisting of a left trace portion 21 and a right trace portion 22. Trace portions 21, 22 are obtainable when the vehicle is traveling substantially westwardly and eastwardly, respectively. In FIG. 4, in which any magnetic field due to body magnetization is neglected, designated at reference numeral 23 is a vector circle as a set of loci of those bearing data obtained from an ideally uniform geomagnetic field. It is further known that in such geographical area the geomagnetic force is relatively weak in the east-west direction, i.e., the magnetic force vector has a relative small cosine component with respect to such direction, thus causing the geomagnetic transformation in the loci of bearing data from the ideal circle 23 into the elliptic trace 20. As a result, when the vehicle is traveling in such geomagnetically abnormal area, any correct offset point would not be obtainable by the above-described method when applied directly as it is.

To obtain a correct offset point with possible errors minimized in such geomagnetically abnormal area, there is employed a modified correction method in consideration of the following fact.

Namely, in such abnormal area, the X direction cosine of the geomagnetic force as detected to be mapped in the form of a radius vector on the X-Y plane, i.e., the component of the geomagnetic force vector in the west-to-east direction, is relatively small in comparison with the radius of the ideal circle 23, while the Y direction sine thereof, i.e., the component of the geomagnetic force vector in the south-to-north direction, is substantially equal to the radius of the ideal circle 23.

In this respct, in a partical case in which a local magnetic field is generated by the body magnetization of the vehicle, the elliptic trace 20 of FIG. 4 is to be wholly displaced on the X-Y plane in the same direction as and by a distance equal to the length of a magnetic force vector representing the local magnetic field as detected.

In the modified correction method, as a first step, in each 16th angle range an average point 20a, 20b, 20c, . . . is obtained in a manner similar to that described in connection with FIG. 2, and the average points 20a, 20b, 20c, . . . are all averaged of their Y components to thereby determine the Y component of a formal offset point (Xp, Yp). Then, in the 16 average points, two such points 20d, 20e that have larger Y components than the others, and two such points 20l, 20m that have smaller Y components than others are selected to be averaged in their X components to thereby determine the X component of the formal offset point (Xp, Yp). Thereafter, the four average points 20d, 20e, 20l, and 20m are averaged of their distances relative to the formal offset point (Xp, Yp), to thereby determine a formal radius Rp. Consequently, there is provisionally established an ideal vector circle whose center and radius are represented by the formal offset point (Xp, Yp) and the formal radius Rp.

Moreover, eight average points on the right trace portion 22 of the elliptic trace 20 are averaged of their distances relative to the formal offset point (Xp, Yp) to thereby obtain a right average distance Dra, from which the difference between the right average distance Dra and the formal radius Rp is then computed. Likewise, eight average points on the left trace portion 21 are averaged of their distances relative to the point (Xp, Yp) to thereby obtain a left average distance Dla, from which the difference between the left average distance Dla and the formal radius Rp is then computed.

Thereafter, now having computed the two differences, each given in terms of an absolute value, when either is larger than a predetermined value K, the vehicle is assumed to be passing a geomagnetically abnormal area, and the formal offset point (Xp, Yp) is employed as an actual offset point. On the other hand, when the differences are both smaller than the predetermined value K, the detected geomagnetic field is assumed to be normal, and then an offset point (Xoff, Yoff) is obtained in the above-mentioned manner.

The foregoing process may be effective even when obtaining an offset point from a set of bearing data not covering the whole circumference angle, too.

Furthermore, when traveling along a usual road, the vehicle may happen to meet a transient magnetic disturbance caused by other vehicles, such as an automobile and a truck, as well as a turbulent local magnetic field such as due to a tunnel and an iron bridge. As a result, when processed in the above-described basic manner, the bearing data obtained during such usual travel would be unable to provide correct values for the offset point which may be changed by such rendering magnetic disturbance and turbulent magnetic field, thus it impossible to achieve a stable display of correct bearing of the vehicle. To overcome such problem and to eliminate the effects of magnetic disturbance and turbulent magnetic field, there is employed another modified example of the preferred embodiment of the invention in which the correction of bearing data is executed intermittently by making use of a timer. More particularly, the computation of an offset point by means of average points in 16 angle ranges, as well as the storing thereof, is performed at intervals of a preset time constant.

In this respect, there may be employed still another modified example in which such computation of the offset point as well as the storing thereof is performed at intervals of a predetermined distance employed in place of the time constant, i.e., each time when the vehicle has traveled by such distance.

Incidentally, in the case where the vehicle has its body magnetization changed such as when traveling over a crossing of an electric railroad, those bearing data left as they have been stored obstruct the computation of a correct offset point. To avoid the occurrence of such problem, the bearing indication system 10 is provided with a strong magnetic field detector (not shown) for detecting a local magnetic field strong enough to change the body magnetization of the vehicle and, when such strong magnetic field is detected, all the bearing data as well as the offset point stored till then are cleared, to thereby permit new bearing data to be detected to be stored as well as a new offset point to be computed therefrom and stored while the vehicle is traveling in various directions after having passed such magnetic field.

In this respect, for the same purpose, there may by employed a strong magnetic field detection means comprising an enlarged sensitive range of the the geomagnetic field sensor 11. Further, to achieve a similar effect, there may be favorably employed a step of weighing lightly old bearing data, in place of clearing off the old data.

Figure 5:
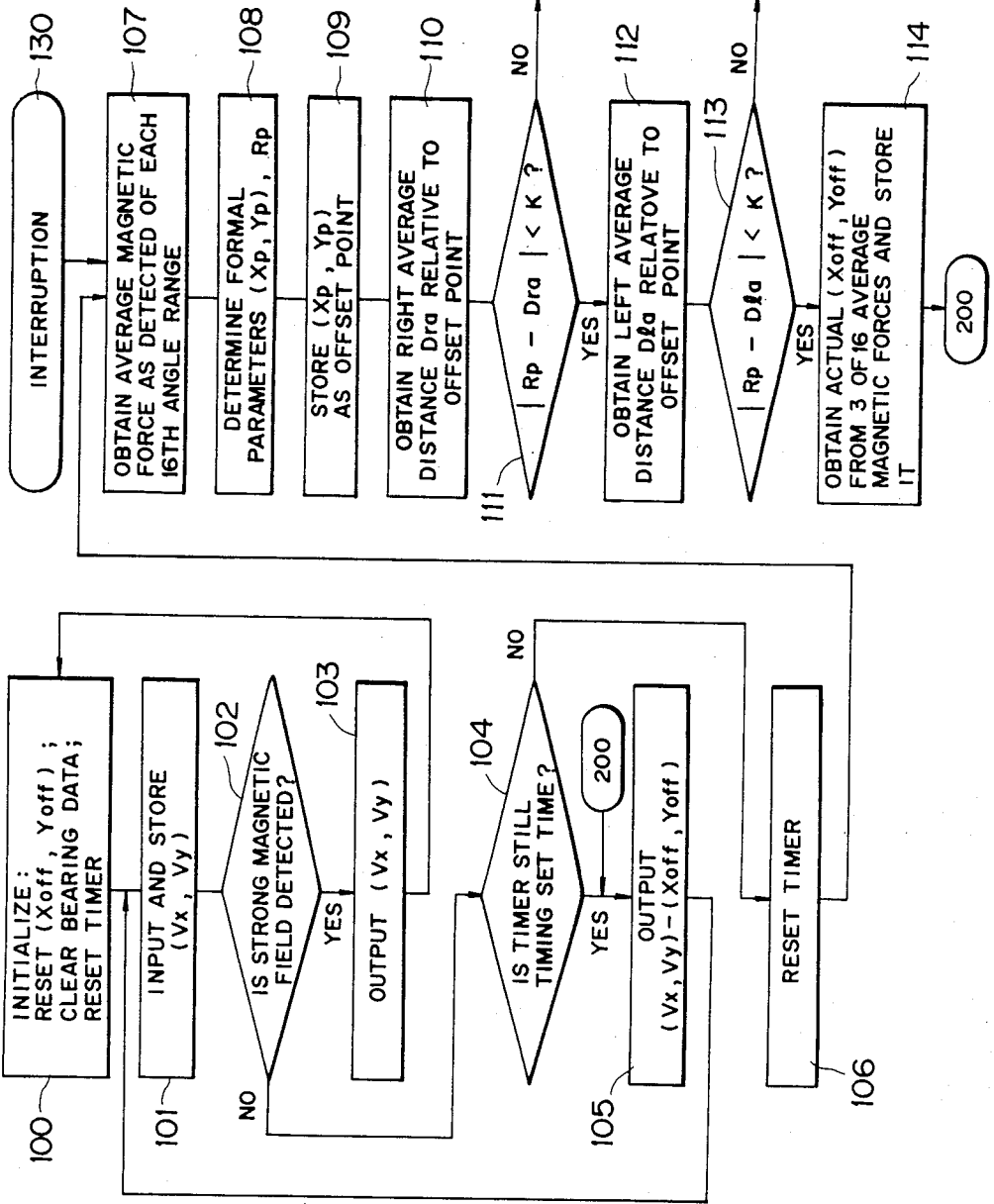
FIG. 5 is a flow chart of a CPU program of the bearing indication system of FIG. 3, the CPU program being prepared in accordance with the preferred embodiment of the present invention.

Referring now to FIG. 5, there will be described hereinbelow the function of the bearing indication system 10, particularly that of the CPU 13.

In FIG. 5 showing the program stored in the ROM 14, designated at reference numeral 100 is an initializing stage in which the offset point (Xoff, Yoff) is reset to (0, 0), all the bearing data are cleared off, and the timer is reset.

From the initializing stage 100 a main loop extends including an input stage 101 for inputting and storing the bearing data in terms of (Vx, Vy), upper and lower decision stages 102 and 104 for the decisions whether a strong local magnetic field is detected and whether the timer is still timing a preset time thereof, respectively, and an output stage 105 for outputting a display signal in terms of (Vx, Vy)–(Xoff, Yoff). At the upper decision stage 102, when a strong magnetic field is decided to be detected the program flow returns through stage 102 to the initializing stage 100. In the lower decision stage 104, when the timer is decided not to be still timing the preset time, the program flow proceeds through a subroutine leading to a terminal 200, thereby updating the offset point (Xoff, Yoff) as circumstances require.

The subroutine includes a resetting stage 106 for resetting the timer, and an operation stage 107 for arithmetically obtaining an average of detected magnetic forces in terms of an average point in each 16th angle range. Another operation stage 108 arithmetically determines the formal offset point (Xp, Yp) and the formal radius Rp. A storing stage 109 stores the formal offset point (Xp, Yp) in terms of an offset point (Xoff, Yoff). Still another operation stage 110 arithmetically obtains the right average distance Dra relative to the offset point. A decision stage 111 decides whether $|Rp-Dra|<K$. Another operation stage 112 obtains the left average distance Dla relative to the offset point. Another decision stage 113 decides whether $|Rp-Dla|<K$. A last operation stage 114 arithmetically obtains an actual offset point (Xoff, Yoff) from at least three of 16 average magnetic forces, and stores the same.

Accordingly, through the subroutine, there is made a decision whether the vehicle is traveling in a geomagnetically abnormal area. At the decision stage 111 or 113, when such traveling is decided to be experienced, the program flow returns through the terminal 200 to the output stage 105, thus giving an ouput signal (Vx, Vy) as corrected by the stored formal offset point (Xoff, Yoff). On the other hand, when such traveling is decided not to be experienced, the actual offset point (Xoff, Yoff) is computed and stored to update the old offset point and, thereafter, the program flow returns through the terminal 200 to the output stage 105, thereby permitting the display unit 16 to display the bearing of the vehicle as corrected by the stored actual offset point (Xoff, Yoff).

There may be employed a further modified example of the preferred embodiment of the invention in which the decision stage 102 is directly connected to the output stage 105 when the offset point is needed to be updated while the vehicle is moving.

There may be employed a yet modified example in which a counter is provided for generating an interruption signal each time the vehicle has traveled a predetermined distance, to thereby interrupt from a terminal 130 into the operation stage 107 of the subroutine. In this case, the stages 107 to 114 are programmed as an interruption routine, so that the program flow does not proceed from the decision stage 111 or 113 to the terminal 200, but directly returns to the main loop.

In the foregoing preferred embodiment of the invention, in which an offset value is obtained, a computation is suitably permitted to be made of the strength of the geomagnetic field at each detecting point. Such geomagnetic field strength may be stored and, when in a geomagnetically abnormal area a magnetic field is detected varying in strength as traveling direction of the vehicle changes, utilized to be put in place of the detected strength of such abnormal magnetic field.

As will be understood from the foregoing description, according to the present invention, in a vehicle-mounted bearing indication system including a geomagnetic field sensor, those errors existing in display signals as output from the sensor can be eliminated by the steps of obtaining data of geomagnetic field while the vehicle is traveling under a usual condition, computing an offset point on the basis of such data, and correcting the output signal of the sensor in consideration of the offset point. In other words, the output of the geomagnetic field sensor is not directly corrected, and an offset point is updated in a timing manner without the need of high processing speeds, thus permitting a CPU to parallelly process other tasks. Moreover, even when the offset point is deviating while the vehicle is traveling, the fact that the geomagnetic field data are stored at all times in addition to the fact that the output of the sensor is monitored permits updating the offset point for correcting the sensor output. The above described features enable the correction of the sensor to be made with relatively high accuracy in accordance with the traveling condition of the vehicle. Particularly, there is effectively permitted an automatic correction of the offset point, which provides a sufficient convenience. Further, as will be comprehended from the foregoing description, the driver of a vehicle equipped with the present invention is not required to make any driving maneuvers for the correction of the output of the sensor, which is in contrast to the conventional systems, as discussed hereinabove. Correction provided by the present invention is thus able to be made in an easy and simple manner, thereby giving rise to the commercial value of associated bearing indication system.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed is:

1. A correction method for a geomagnetic field sensor of a bearing indication system mounted on a vehicle, said bearing indication system including signal processing means for computing and outputting a bearing of said vehicle in accordance with an output signal of said geomagnetic field sensor, said signal processing means having storing means for storing data of said bearing of said vehicle, and display means for displaying said bearing of said vehicle in accordance with an output of said signal processing means, comprising:

a first step of storing said output signals of said geomagnetic field sensor as said data of said bearing of said vehicle with respect to all directions while said vehicle is traveling, said all directions being divided into at least three bearing ranges having an equal angle with each other;

a second step of computing and storing a first bearing correction vector on the basis of a first set of average points each respectively determined from said data of said bearing as associated with one of all of said bearing ranges, and computing and storing a second bearing correction vector on the basis of a second set of average points each respectively determined from said data of said bearing as associated with one of at least three of said bearing ranges; and a third step of determining from the magnitude of said first correction vector whether said vehicle has traveled a geomagnetically abnormal area, and based on said determination outputting a correction signal based on either of said first or said second bearing correction vector for correcting said output signals of said geomagnetic field sensor.

2. A correction method for a geomagnetic field sensor of a bearing indication system mounted on a vehicle, said bearing indication system including signal processing means for computing and outputting a bearing of said vehicle in accordance with an output signal of said geomagnetic field sensor, said signal processing means having storing means for storing data of said bearing of said vehicle, and display means for displaying said bearing of said vehicle in accordance with an output of said signal processing means, comprising:

a first step of storing said output signals of said geomagnetic field sensor as said data of said bearing of said vehicle with respect to all directions while said vehicle is traveling, said all directions being divided into at least three bearing ranges having an equal angle with each other;

a second step of computing and storing an initial bearing correction vector on the basis of a set of average points each respectively determined from said data of said bearing as associated with one of all of said bearing ranges;

a third step of deciding as to whether said vehicle has traveled a geomagnetically abnormal area through usage of said initial bearing correction vector and said average points each respectively determined from said data of said bearing as associated with said one of all said bearing ranges, such that when said vehicle is decided to have traveled said geomagnetically abnormal area said initial bearing correction vector is deemed to be actual, and when said vehicle is decided not to have traveled said geomagnetically abnormal area a subsequent bearing correction vector is computed on the basis of a set of average points each respectively determined from said data of said bearing as associated with one of at least three of said bearing ranges and stored in place of said initial bearing correction vector; and a fourth step of outputting a correction signal based on either of said initial bearing correction vector or said subsequent bearing correction vector as stored for correcting said output signals of said geomagnetic field sensor.

3. A correction method according to claim 2, wherein:
said geomagnetic field sensor includes detecting means for detecting a strong magnetic field; and
when said detection means has detected said strong magnetic field, said data of said bearing as stored are all cleared to be zero.

4. A correction method according to claim 2, wherein:
said initial bearing correction vector is updated at intervals of a predetermined period of time.

5. A correction method according to claim 2, wherein:
said initial bearing correction vector is updated each time when said vehicle has traveled a predetermined distance.

* * * * *

UNITED STATES PATENT AND TRADEMARK OFFICE
CERTIFICATE OF CORRECTION

PATENT NO. : 4,660,161

DATED : April 21, 1987

INVENTOR(S) : Yasushi OKADA

It is certified that error appears in the above-identified patent and that said Letters Patent is hereby corrected as shown below:

```
Column 2, line 50, after "crossing" change "magentization"
to --magnetization--.
Column 3, line 32, insert a period after "spot".
Column 6, line 44, change "partical" to --practical--.
Column 7, line 33, delete "rendering";
          line 34, before "it" insert --rendering--.
Column 9, line 24, before "geomagnetic" insert --a--.
```

Signed and Sealed this

Sixth Day of October, 1987

*Attest:*

DONALD J. QUIGG

*Attesting Officer*   *Commissioner of Patents and Trademarks*